United States Patent [19]
Arcaro

[11] Patent Number: 5,918,716
[45] Date of Patent: Jul. 6, 1999

[54] SOLENOID ACTUATED REVERSING MECHANISM

[75] Inventor: David J. Arcaro, Boise, Id.

[73] Assignee: Hewlett-Packard Company, Palo Alto, Calif.

[21] Appl. No.: 08/938,134

[22] Filed: Sep. 26, 1997

[51] Int. Cl.$^6$ ............................. F16D 19/00; F16D 11/06; F16H 37/06
[52] U.S. Cl. ...................... 192/84.81; 192/81 C; 192/72; 192/51; 192/43; 74/665 GA
[58] Field of Search ............... 192/84.81, 81 C, 192/72, 51, 43; 74/665 GA

[56] References Cited

U.S. PATENT DOCUMENTS

| | | | |
|---|---|---|---|
| 2,959,986 | 11/1960 | Irgens et al. | 192/81 C |
| 3,315,773 | 4/1967 | Aschauer | 132/84.81 X |
| 4,321,992 | 3/1982 | Gallo | 192/84.81 X |
| 4,655,724 | 4/1987 | Law | 74/665 GA X |
| 4,825,988 | 5/1989 | Nishimura | 192/84.81 X |
| 5,127,502 | 7/1992 | Billings | 192/81 C X |

*Primary Examiner*—Charles A. Marmor
*Assistant Examiner*—Roger Pang
*Attorney, Agent, or Firm*—Lane R. Simmons

[57] ABSTRACT

A magnetic flux path mechanism for a solenoid actuated device includes a stationary coil for generating lines of magnetic flux when energized, a stationary case enclosing the stationary coil on an outside perimeter of the coil, and a rotatable sleeve disposed on an inside perimeter of the stationary coil. A magnetic flux path is provided through the stationary case and rotatable sleeve about the stationary coil. In a preferred embodiment, a wrap spring is disposed on an output shaft of the solenoid actuated device and is normally engaged on its outside perimeter with the inside perimeter of the rotatable sleeve. The rotatable sleeve is continuously driven in a forward direction and, because of the self engaging wrap spring, drives the output shaft in the forward direction. The sleeve is of an iron composition as it forms part of the core of the solenoid for enabling the magnetic flux. When the coil is energized, a floating control ring enables the solenoid thereby enabling the output shaft to be driven in a reverse direction. Gearing is utilized in connection with a single input drive shaft such that the rotatable sleeve is continuously driven in the forward direction, and the shoulder is continuously driven in the reverse direction. Thus, the output shaft is continuously driven in the forward direction by the self-energizing spring and rotatable sleeve until the coil is energized whereby the output shaft is driven in the reverse direction by the spring being wrapped down in response to the control ring being attracted to the shoulder.

11 Claims, 2 Drawing Sheets

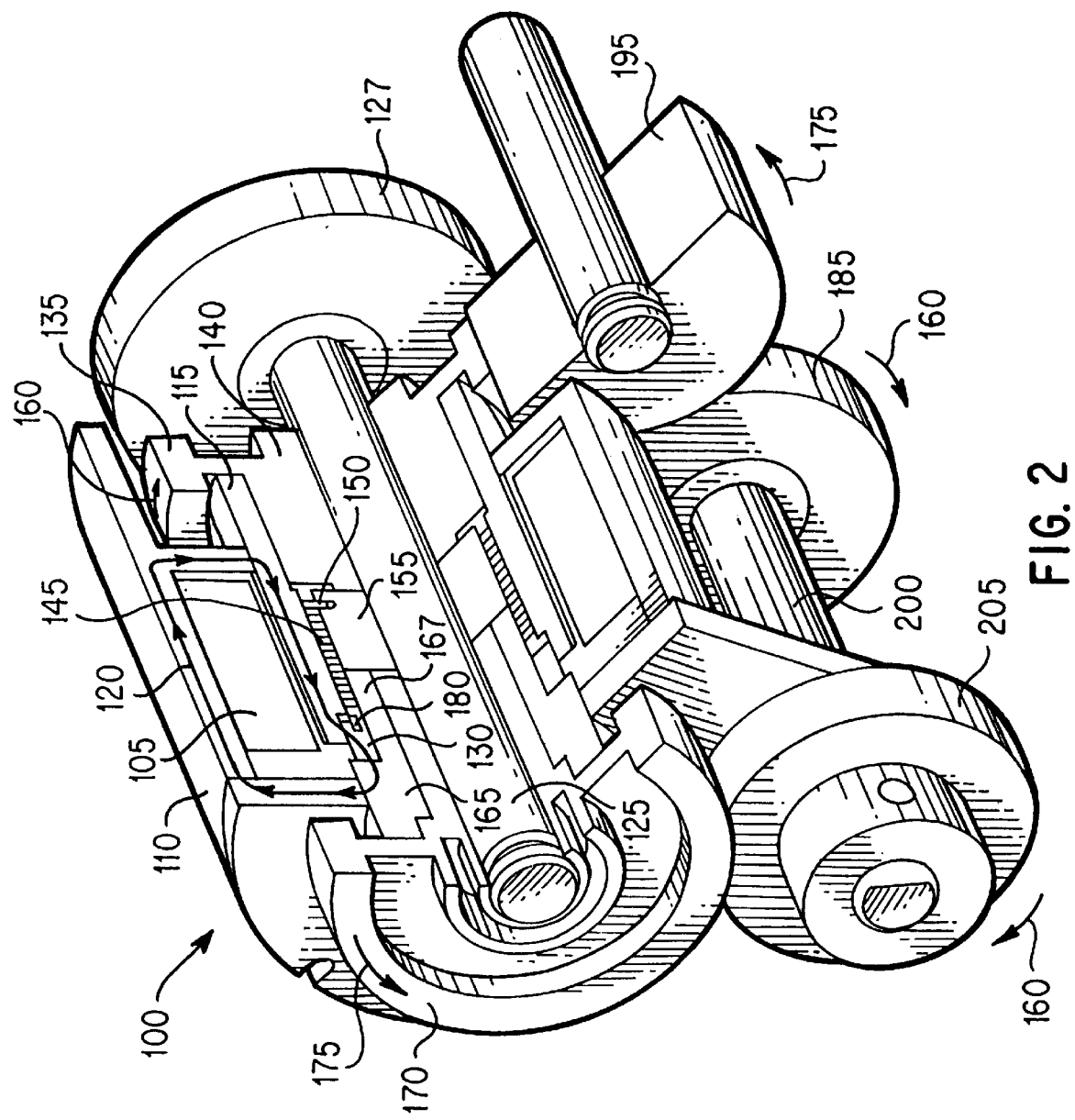

SOLENOID ACTUATED REVERSING MECHANISM

FIELD OF THE INVENTION

This invention relates in general to electric spring clutches and, more particularly, to a reversing mechanism for enabling a bi-directional solenoid actuated device.

BACKGROUND OF THE INVENTION

A conventional radial electric spring clutch, also referred to as a solenoid actuated device, provides a well known means in the art for enabling high torque capacity with low activation energy. FIG. 1 is a cut away perspective view of a conventional electric spring clutch 10 and is shown to clearly identify the workings of the same for background purposes with respect to the present invention. In a typical spring clutch, electric current is passed through a stationary coil 15. Responsive to the current, lines of magnetic flux 20 are generated and used to attract a floating control ring 25 to a shoulder 30. Shoulder 30 is connected to hub 40 and output shaft 45. Control ring 25 is attached to one end of wrap spring 35. The other end of wrap spring 35 is attached to neck 47 of input gear 50. As input gear 50 is turned, wrap spring 35 wraps down onto neck 47 and hub 40. Thus, torque is transferred from the input 50 (and neck 47) through the wrap spring 35 to hub 40 and output shaft 45 when control ring 25 is attracted to shoulder 30.

Importantly, the lines of magnetic flux 20 pass through casing (or housing) 55 about stationary coil 15. Although casing 55 may comprise one or more components pressed or attached together, casing 55 (and/or all its components jointly) is stationary relative to the rotation of input gear 50 and output shaft 45. Magnetic flux 20 is forced to skirt outside of casing 55 and pass through control ring 25, thus forcing it against shoulder 30, because component 60 does not conduct the magnetic flux. The attraction of the control ring 25 to shoulder 30 upon energizing of coil 15 produces the solenoid (or clutch) effect to engage output shaft 45 with the rotation of input gear 50. Conversely, after electric current is removed from coil 15, the magnetic attraction is lost, thus causing the solenoid or clutch to disengage as the wrap spring 35 unwraps from hub 40 and neck 47.

Conventional solenoid (or electric clutch) devices have many uses and provide an effective means for enabling high torque capacity with low activation energy. However, such conventional devices enable a rotational engagement in a single direction only. Thus, in the event a bi-directional rotational engagement is needed, two clutches must be used. One to engage in a first direction, and the other to engage in the opposite direction. Or, in the event both clutches engage in the same direction, strategic positioning of the dual clutches relative to each other must occur to obtain the desired result of bi-directional engagement. In either case, the need for dual clutches (solenoids) can be costly and can complicate mechanical design factors for the application or device at issue.

Accordingly, an object of the present invention is to provide a bi-directional enabling solenoid actuated (spring clutch) device.

SUMMARY OF THE INVENTION

According to principles of the present invention in a preferred embodiment, a magnetic flux path mechanism for a solenoid actuated device includes a stationary coil for generating lines of magnetic flux when energized, a stationary case enclosing the stationary coil on an outside perimeter of the coil, and a rotatable sleeve disposed on an inside perimeter of the stationary coil. A magnetic flux path is provided through the stationary case and rotatable sleeve about the stationary coil.

In a preferred embodiment, a wrap spring is disposed on an output shaft of the solenoid actuated device and is normally engaged on its outside perimeter with the inside perimeter of the rotatable sleeve. The rotatable sleeve is continuously driven in the forward direction and, because of the self engaging wrap spring, drives the output shaft in the forward direction. The sleeve is of an iron composition as it forms part of the core of the solenoid for enabling the magnetic flux. When the coil is energized, a floating control ring enables the solenoid (i.e., the floating control ring is attracted to a rotating shoulder) thereby enabling the output shaft to be driven in a reverse direction.

In a preferred embodiment, gearing is utilized in connection with a single input drive shaft such that the rotatable sleeve is continuously driven in the forward direction, and the shoulder is continuously driven in the reverse direction. Thus, the output shaft is continuously driven in the forward direction by the self-energizing spring and rotatable sleeve until the coil is energized whereby the output shaft is driven in the reverse direction by the spring being wrapped down in response to the control ring being attracted to the shoulder.

Other objects, advantages, and capabilities of the present invention will become more apparent as the description proceeds.

DESCRIPTION OF THE DRAWINGS

FIG. 2 is a cut away perspective view of the present invention solenoid actuated reversing mechanism.

DETAILED DESCRIPTION OF THE INVENTION

Figure 1:
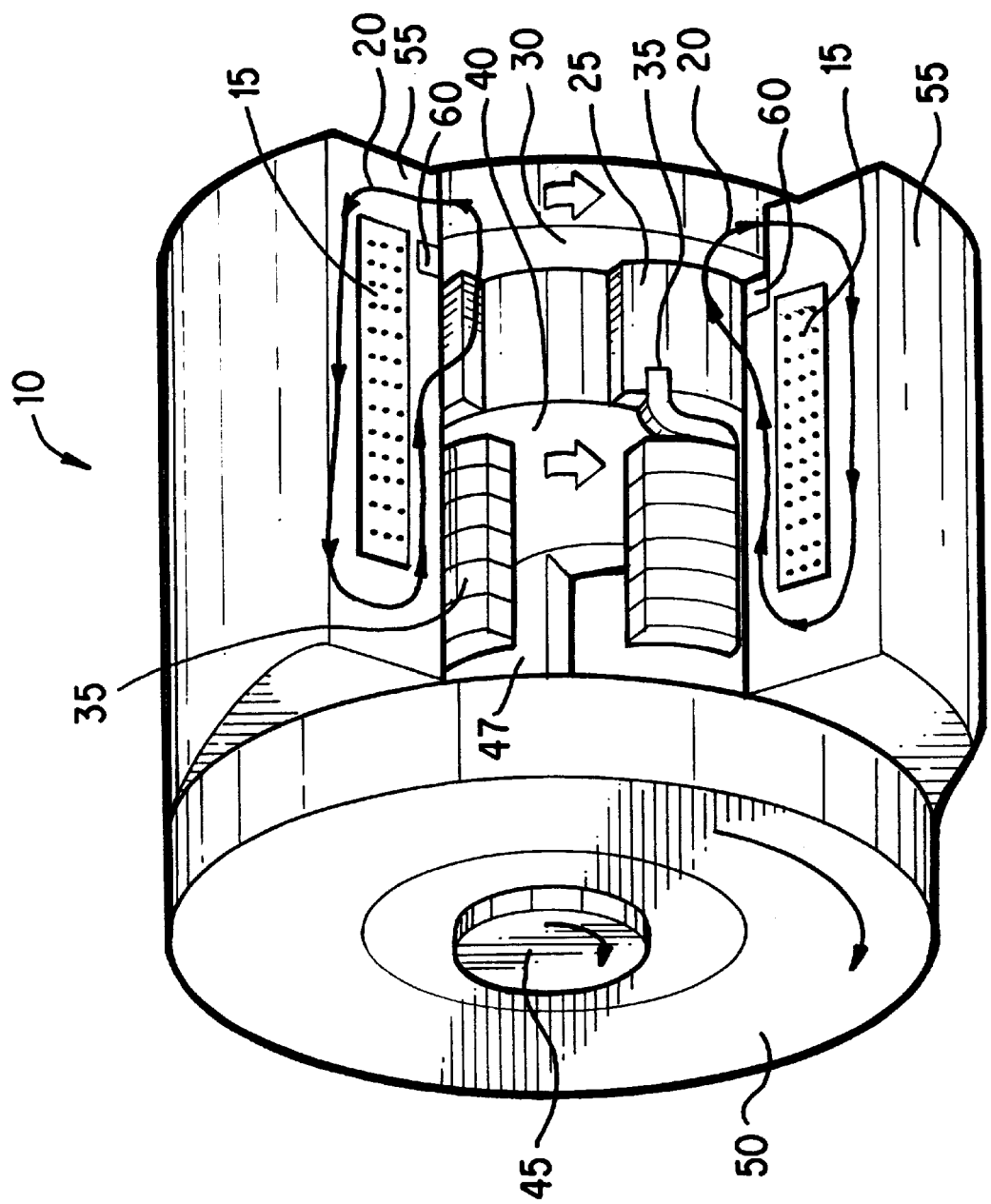
FIG. 1 is a cut away perspective view a conventional electric spring clutch shown to describe typical workings of the same.

FIG. 1 is a cut away perspective view a conventional electric spring clutch 10 and is discussed in the Background to describe the typical workings of the same and to show, specifically, the conventional stationary casing/core 55 disposed about the stationary coil 15 for enabling the magnetic flux lines 20.

FIG. 2 is a cut away perspective view of the present invention solenoid actuated reversing mechanism 100 which includes stationary coil 105, casing 110 disposed about an outside perimeter of coil 105 and, importantly, rotatable sleeve 115 disposed on an inside perimeter of coil 105. Thus, a flux path 120 is provided about coil 105 through stationary casing 110 and rotatable sleeve 115 to enable solenoid actuation. Additionally, rotatable sleeve 115 provides a means for engaging output shaft 125 and output gear 127 (which is fixedly attached to output shaft 125) in a direction that is reversed from that provided by energizing coil 105 as will be discussed more fully herein.

Generally speaking, sleeve 115 is continuously rotated about output shaft 125 by gear 135 in a first ("forward") direction denoted by directional arrow 160. Sleeve 115 is fixedly attached to shoulder 140 of gear 135. Thus, when gear 135 is rotated, sleeve 115 is rotated. As sleeve 115 is rotated, wrap spring 145 is self-energized against the inside perimeter of sleeve 115 (assuming coil 105 is not energized).

Namely, wrap spring 145 and sleeve 115 are disposed close enough to each other such that wrap spring 145 is expanded by the rotation of sleeve 115 and is engaged therewith. Since one end 150 of wrap spring 145 is attached to hub 155 which is fixedly attached to output shaft 125, the expansion of spring 145 against sleeve 115 engages output shaft 125 into "forward" rotation with sleeve 115 (and gear 135) as shown by directional arrow 160. Advantageously, output shaft 125 (and output gear 127) are also free wheeling in the "forward" direction, meaning that the shaft may be rotated (by some external force not shown) faster than, but not less than, the rotational velocity of sleeve 115 when coil 105 is not energized.

On the other hand, shoulder 165 and neck (wrap hub) 167 are fixedly attached to gear 170 and together are continuously rotated about output shaft 125 in a second ("reverse") direction denoted by directional arrow 175. When coil 105 is energized, floating control ring 130 is attracted to shoulder 165. Since the other end 180 of wrap spring 145 is attached to control ring 130, spring 145 wraps down onto neck 167 (of shoulder 165) and hub 155 as gear 170 is rotated. To this end, torque is transferred from the input (shoulder 165, neck 167 and gear 170), through spring 145, to hub 155 and output shaft 125, thereby causing output shaft 125 to also rotate in the "reverse" direction 175.

Stepping back to look at the gearing and drive means associated with reversing mechanism 100, input gear 185 (or, alternately, shaft 200) receives a force in a "forward" rotational direction 160 from an exterior source (not shown). Gear 185 rotates gear 135 also in the forward direction via idler gear 195. As discussed, gear 135 is attached to shoulder 140 which is attached to sleeve 115. Thus, again, sleeve 115 continuously rotates in the "forward" direction 160 as driven by input gear 185 through idler gear 195.

To effectuate the "reverse" direction 175, input gear 185 is attached to shaft 200 which is attached to gear 205. Gear 205 directly drives gear 170. Since gear 205 rotates in the "forward" direction with input gear 185, and since gear 205 directly drives gear 170, gear 170 is thereby continuously driven in the "reverse" direction 175.

All the gears 127, 135, 170, 185, 195, and 205 are shown in the Figure without teeth for simplicity of drawing purposes. However, it will be understood by those of ordinary skill in the art that any conventional means may be used to effectuate the gearing interconnections. For example, teeth may be used to interconnect the gears, or a direct drive pressed interface may be used between the gears, or the gears may be belt connected. Additionally, "connected" or "interconnected" means directly connected or indirectly connected through other components and/or gears.

All in all, the gearing described effectuates a continuous rotation of sleeve 115 in a "forward" direction and, simultaneously, a continuous rotation of shoulder 165 in a "reverse" direction. It should be noted, however, that the directional labels of "forward" and "reverse" are not absolute but may be interchanged, depending upon perspective. But as per the drawing, with the "forward" rotation 160 shown, spring 145 self energizes against sleeve 115 as the spring is expanded away from hub 155 in response to the "forward" rotation of sleeve 115. Thus, spring 145 engages sleeve 115 with shaft 125 (via hub 155) and continuously rotates output shaft 125 (and output gear 127) in the "forward" direction so long as coil 105 remains not energized. However, as soon as coil 105 is energized, flux 120 causes control ring 130 to be attracted to rotating shoulder 165, thereby tightening the diameter of spring 145 and engaging it down against hub 155 and neck 167 of shoulder 165 so that the spring no longer is self energized against sleeve 115. Thus, spring 145 engages rotating shoulder 165 with shaft 125 (via hub 155) and thereby causes output shaft 125 and output gear 127 to be rotated in the "reverse" direction.

What has been described above are the preferred embodiments of a solenoid activated reversing mechanism. It will be obvious to one of ordinary skill in the art that the present invention is easily implemented utilizing any of a variety of components existing in the art. Moreover, while the present invention has been described by reference to specific embodiments, it will be apparent that other alternative embodiments and methods of implementation or modification may be employed without departing from the true spirit and scope of the invention.

What is claimed is:

1. A solenoid actuated device, comprising:
   (a) a stationary coil for generating lines of magnetic flux when energized;
   (b) a stationary case enclosing the stationary coil on an outside perimeter of the coil;
   (c) a rotatable sleeve disposed on an inside perimeter of the stationary coil, whereby a magnetic flux path is provided through the stationary case and rotatable sleeve about the stationary coil;
   (d) an output shaft, wherein the rotatable sleeve is disposed about the output shaft, each having a same axis of rotation;
   (e) means for driving the output shaft in a first direction when the stationary coil is energized;
   (f) means associated with the rotatable sleeve for driving the sleeve in a second direction; and,
   (g) engagement means for engaging the sleeve with the output shaft when the stationary coil is not energized for driving the output shaft in the second direction.

2. A magnetic flux path mechanism, comprising:
   (a) a stationary coil for generating lines of magnetic flux when energized;
   (b) a stationary case enclosing the stationary coil on an outside perimeter of the coil;
   (c) a rotatable sleeve disposed on an inside perimeter of the stationary coil, whereby a magnetic flux path is provided through the stationary case and rotatable sleeve about the stationary coil;
   (d) a shaft rotatably disposed through the rotatable sleeve;
   (e) a first wrap hub rotatably disposed about the shaft, the first wrap hub having a first shoulder affixed thereto;
   (f) a floating control ring disposed about the first wrap hub such that the floating control ring is attracted to the first shoulder when the stationary coil is energized;
   (g) means for driving the first wrap hub in a first direction;
   (h) a second wrap hub affixed to the shaft;
   (i) a second shoulder rotatably disposed about the shaft and affixed to the sleeve;
   (j) means for driving the second shoulder in a second direction; and,
   (k) a wrap spring disposed about at least part of the first and second wrap hubs, the wrap spring having a first end attached to the floating control ring, and a second end attached to the second wrap hub, and wherein the sleeve is disposed about the wrap spring, and wherein the wrap spring engages the first wrap hub with the shaft when the stationary coil is energized and the floating control ring is attracted to the first shoulder for driving the shaft in the first direction, and wherein the wrap spring self engages the sleeve with the shaft when the stationary coil is not energized for driving the shaft in the second direction.

3. A solenoid actuated reversing mechanism, comprising:
(a) a stationary coil disposed about an axis, the coil having a casing disposed about an outside perimeter of the coil and a sleeve disposed on an inside perimeter of the coil, the sleeve being rotatable about the axis, and whereby a magnetic flux path is provided through the stationary case and rotatable sleeve when the coil is energized;
(b) first driving means attached to the rotatable sleeve for driving the sleeve in a first direction about the axis;
(c) a shaft disposed through the sleeve and rotatable about the axis;
(d) a solenoid mechanism rotatably disposed about the shaft opposite the first driving means;
(e) second driving means operatively connected to the solenoid mechanism for driving the solenoid mechanism in a second direction; and,
(f) engagement means disposed about the shaft for engaging the rotatable sleeve to the shaft for driving the shaft in the first direction when the coil is not energized, and for engaging the solenoid mechanism to the shaft for driving the shaft in the second direction when the coil is energized.

4. The reversing mechanism of claim 3 wherein the solenoid mechanism includes a floating control ring and a shoulder, and wherein the engagement means includes a spring wrapped around the shaft with one end attached to the shaft, directly or indirectly, and an opposite end attached to the floating control ring, and wherein when the coil is not energized the spring self energizes against an inside perimeter of the sleeve for driving the shaft in the first direction, and wherein when the coil is energized the spring is drawn down against the shaft as the floating control ring is attracted to the shoulder for releasing the spring from the inside perimeter of the sleeve and for driving the shaft in the second direction.

5. A reversible drive mechanism, comprising:
(a) an input drive shaft having first and second input drive means affixed thereto, the input drive shaft being rotatable in at least a first direction;
(b) an output drive shaft having first and second output drive means rotatably disposed about the output drive shaft, the first output drive means being operatively connected to the first input drive means via an idler drive means such that the first output drive means rotates in the first direction, and the second output drive means being operatively connected to the second input drive means such that the second output drive means rotates in a second direction opposite the first direction; and,
(c) a solenoid mechanism operatively disposed about the output drive shaft, including a wrap spring disposed about the shaft and further including a stationary coil disposed about the shaft and having a rotatable sleeve on an insider perimeter of the coil and a stationary housing on an outside perimeter of the coil, and wherein the sleeve is attached to the first output drive means, whereby:
  (i) in the event the coil is not energized, the wrap spring operatively engages the sleeve and the first output drive means with the output drive shaft for rotating the output drive shaft in the first direction; and,
  (ii) in the event the coil is energized, the solenoid mechanism operatively engages the second output drive means with the output drive shaft for rotating the output drive shaft in the second direction.

6. A solenoid actuated reversing mechanism, comprising:
(a) a wrap spring disposed about an output shaft and having one end attached to the shaft and another end attached to a floating control ring;
(b) a magnetic flux path about a stationary coil, the flux path including a stationary case disposed about an outside perimeter of the stationary coil and a rotatable sleeve core dispose on an inside perimeter of the stationary coil, wherein the rotatable sleeve core is disposed about the wrap spring, and whereby the wrap spring is self energized against an inside perimeter of the rotatable sleeve core when the stationary coil is not energized and as the rotatable sleeve core is rotated in a first direction such that the output shaft is rotated in the first direction, and whereby the wrap spring is drawn down against the output shaft as the floating control ring is attracted to a shoulder disposed about the output shaft when the stationary coil is energized such that the output shaft is rotated in a second direction following a rotating direction of the shoulder.

7. A bi-directional output mechanism comprising:
(a) an output shaft disposed in association with a solenoid mechanism;
(b) a first mechanism rotatingly disposed about the output shaft for driving the output shaft in a first direction in response to a non-activation of the solenoid mechanism; and,
(c) a second mechanism rotatingly disposed about the output shaft for driving the output shaft in a second direction in response to an activation of the solenoid mechanism.

8. The bi-directional output mechanism of claim 7 wherein the first mechanism includes a core disposed about the output shaft on an inside perimeter of a coil winding of the solenoid mechanism.

9. The bi-directional output mechanism of claim 7 further including a wrap spring disposed about the output shaft on an inside perimeter of the first mechanism and having one end attached to the output shaft and an opposite end attached to the solenoid mechanism, the wrap spring for engaging the first and second mechanisms with the output shaft respectively.

10. A method of bi-directionally engaging an output shaft disposed in association with a solenoid device, the method comprising:
(a) continuously rotating a first mechanism in a first direction about the output shaft;
(b) continuously rotating a second mechanism in a second direction about the output shaft; and,
(c) selectively, (i) engaging the first mechanism with the output shaft in response to a non-activation of the solenoid device, or (ii) engaging the second mechanism with the output shaft in response to an activation of the solenoid device.

11. The method of claim 10 wherein the first mechanism includes a core disposed about the output shaft on an inside perimeter of a coil winding of the solenoid device.

* * * * *